United States Patent [19]

Liebig et al.

[11] 4,205,140

[45] May 27, 1980

[54] THERMOPLASTIC MOULDING COMPOSITIONS

[75] Inventors: Lothar Liebig; Frank Wingler, both of Leverkusen; Dieter Margotte; Werner Nouverté, both of Krefeld, all of Fed. Rep. of Germany

[73] Assignee: Bayer Aktiengesellschaft, Leverkusen, Fed. Rep. of Germany

[21] Appl. No.: 852,628

[22] Filed: Nov. 18, 1977

[30] Foreign Application Priority Data

Nov. 23, 1976 [DE] Fed. Rep. of Germany ....... 2653143

[51] Int. Cl.² ............................................. C08L 67/06
[52] U.S. Cl. ........................................ 525/67; 525/74
[58] Field of Search ......................................... 260/873

[56] References Cited

U.S. PATENT DOCUMENTS

| | | | |
|---|---|---|---|
| 3,130,177 | 4/1964 | Grabowski | 260/873 |
| 3,162,695 | 12/1964 | Grabowski | 260/873 |
| 3,336,417 | 8/1967 | Sakuma | 260/873 |
| 3,597,498 | 8/1971 | Christenson | 260/873 |
| 3,813,358 | 5/1974 | O'Connell | 260/873 |
| 3,852,393 | 12/1974 | Furukawa | 260/873 |
| 3,852,394 | 12/1974 | Kubota | 260/873 |
| 3,880,783 | 4/1975 | Serini | 260/873 |
| 3,891,719 | 6/1975 | Schirmer | 260/873 |
| 4,028,433 | 6/1977 | Prinz | 260/873 |

FOREIGN PATENT DOCUMENTS

49-132145 12/1974 Japan ........................................ 260/873
49-132147 12/1974 Japan ........................................ 260/873

*Primary Examiner*—Paul Lieberman
*Attorney, Agent, or Firm*—Connolly and Hutz

[57] ABSTRACT

A thermoplastic moulding composition comprising:
(1.) 80 to 20 parts by wt. of a thermoplastic polycarbonate based on a dihydroxy diaryl alkane,
(2.) 20 to 80 parts by wt. of a graft polymer of
2.2. a monomer mixture, polymerized onto
2.1. a diene rubber with a glass transition temperature below −30° C., of
2.2.1. 95 to 50% by wt. of styrene, methyl methacrylate or a mixture thereof; and
2.2.2. 50 to 5% by wt. of acrylonitrile, methacrylonitrile or a mixture thereof,
the ratio by wt. of rubber (2.1) to monomer mixture (2.2.) being in the range of from 80:20 and 10:90, and the moulding composition containing from 5 to 35% by wt. of the rubber (2.1.), and
(3.) 5 to 75 parts by wt. of a copolymer which is chemically uniform in structure and which comprises:
(3.1.) 93 to 50 parts by wt. of styrene, methyl methacrylate or a mixture thereof;
(3.2.) 40 to 5 parts by weight of acrylonitrile, methacrylonitrile or a mixture thereof; and
(3.3.) 2 to 30 parts by wt. of maleic acid anhydride.

4 Claims, No Drawings

THERMOPLASTIC MOULDING COMPOSITIONS

This invention relates to thermoplastic moulding compositions consisting of a mixture of polycarbonates of dihydric phenols, a graft polymer of resin-forming monomers on a rubber, and a thermoplastic resin, predominantly of styrene, acrylonitrile and maleic acid anhydride. German Pat. No. 1,170,141 describes mixtures of a polycarbonate of aromatic dihydroxy compounds with graft polymers of polybutadiene and a mixture of acrylonitrile and an aromatic vinyl hydrocarbon. By comparison with pure polycarbonates, these mixtures show improved processing properties and greatly improved flow properties. Unfortunately, these improvements are obtained at the expense of other essential properties of the polycarbonate (for example tensile strength, resistance to light and weather). In particular, the dimensional stability under heat of these mixtures is reduced so that these mixtures are not always suitable for use as moulding compositions.

An object of the present invention is to provide polycarbonate-containing thermoplastic moulding compositions having improved moulding properties without any deterioration in the essential properties of the polycarbonate, particularly its dimensional stability under heat.

It has now been found that thermoplastic moulding compositions obtained by mixing a bis-(hydroxyaryl)-alkane polycarbonate with a graft polymer and a special thermoplastic resin of styrene, acrylonitrile and maleic acid anhydride show improved properties and retain the essential properties of the polycarbonate such as, for example, its excellent mechanical and thermal properties.

Accordingly, the present invention provides thermoplastic moulding compositions of polycarbonates, graft polymers of resin-forming monomers on a rubber, and thermoplastic resins. More particularly, the invention provides moulding compositions of:

(1.) 80 to 20 parts by weight of a thermoplastic polycarbonate based on bis-(hydroxyacryl)-alkanes, (2.) 20 to 80 parts by weight of a graft polymer of 2.2 a monomer mixture, polymerised onto 2.1 a diene rubber with a glass transition temperature below −30° C., of 2.2.1. 95 to 50% by weight of styrene, methyl methacrylate or mixtures thereof, and 2.2.2. 50 to 5% by weight of acrylonitrile, methacrylonitrile or mixtures thereof, and (3.) 5 to 75 parts by weight of a copolymer of 3.1. 93 to 50 parts by weight of styrene, methyl methacrylate or mixtures thereof;

3.2 40 to 5 parts by weight of acrylonitrile, methacrylonitrile or mixtures thereof; and 3.3 2 to 30 parts by weight of maleic acid anhydride, wherein (a) the ratio by weight of rubber (2.1) to monomer mixture (2.2) is from 80:20 to 10:90, (b) the copolymer (3) is chemically uniform in structure, and (c) the moulding composition contains from 5.0 to 35% by weight and preferably from 7.5 to 30% by weight of the rubber (2.1).

The copolymer (3) preferably consists of 15 to 30 parts by weight of acrylonitrile units, 7.5 to 15 parts by weight of maleic acid anhydride units, and 77.5 to 55 parts by weight of styrene units.

Compared with conventional moulding compositions, for example those according to German Pat. No. 1,170,141, the moulding compositions according to the invention show improved stability to hot water, distinctly increased thermal stability and high toughness.

In the context of the invention, aromatic polycarbonates are homopolycarbonates and copolycarbonates based for example on one or more of the following bisphenols:

dihydroxy diphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones, $\alpha,\alpha$-bis-(hydroxyphenyl)-diisopropyl benzenes, and their nucleus-alkylated and nucleus-halogenated derivatives. These and other suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846; in German Offenlegungsschrifts Nos. 1,570,703; 2,063,050; 2,063,052; 2,211,956; and 2,221,957; in French Pat. No. 1,561,518; and in the book by H. Schnell entitled "Chemistry and Physics of Polycarbonates", Interscience Publishers, New York, 1964.

Preferred bisphenols are those which correspond to formula (I):

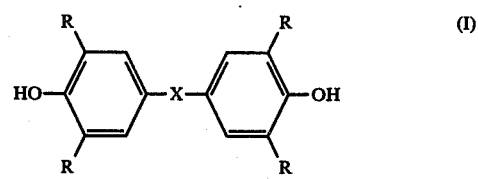

in which R is the same or different in each position and represents H, $C_1$–$C_4$-alkyl, Cl or Br, and X represents a single bond, $C_1$–$C_8$-alkylene, $C_2$–$C_8$-alkylidene, $C_5$–$C_{15}$-cycloalkylene, $C_5$–$C_{15}$-cycloalkylidene, -$SO_2$- or

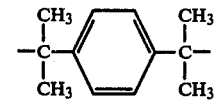

Examples of these bisphenols are 4,4′-dihydroxy diphenyl 2,2-bis-(4-hydroxyphenyl)-propane, 2,4-bis-(4-hydroxyphenyl)-2-methyl butane, 1,1-bis-(4-hydroxyphneyl)-cyclohexane, $\alpha,\alpha$-bis-(4-hydroxyphenyl)-p-diisopropyl benzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methyl butane, 1,1-bis-(3,5-dimethyl-4-hydroxyphenyl)-cyclohexane, $\alpha,\alpha$-bis-(3,5-dimethyl-4-hydroxyphenyl)-p-diisopropyl benzene, 2,2-bis-(3,5-dichloro-4-hydroxyphenyl)-propane and 2,2-bis-(3,5-dibromo-4-hydroxyphenyl)-propane.

Particularly preferred bisphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Preferred aromatic polycarbonates are those based on one or more of the preferred bisphenols mentioned above. Copolycarbonates based on 2,2-bis-(4-hydroxyphenyl)-propane and one of the other particularly preferred bisphenols mentioned above are particularly preferred. Other particularly preferred polycarbonates are polycarbonates based on 2,2-bis-(4-hydroxyphenyl)-propane alone or on 2,2-bis-(3,5-dimethyl-4-hydroxyphenyl)-propane alone.

The aromatic polycarbonates can be produced by known methods, for example by the melt transesterification process from bisphenols and diphenyl carbonate and by the 2-phase interfacial process from bisphenols and phosgene, as described in the above-mentioned literature.

The aromatic high molecular weight polycarbonates can be branched by the incorporation of small quantities, preferably between 0.05 and 2.0 mol % (based on the diphenols used), of compounds having a functionality of three or more, particularly those containing three or more phenolic hydroxy groups.

Polycarbonates of this type are described, for example, in German Offenlegungsschrifts Nos. 1,570,533; 1,595,762; 2,116,974; 2,113,347; in British Pat. No. 1,079,821, in U.S. Pat. No. 3,544,514 and in German Offenlegungsschrift No. 25 00 092.

Some of the compounds containing three or more than three phenolic hydroxy groups which can be used in accordance with the invention are, for example, phloroglucinol, 4,6-dimethyl-2,4,6-tri-(4-hydroxyphenyl)-2-heptane, 4,6-dimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenyl, 2,6-bis-(2-hydroxy-5'-methylbenzyl)-4-methyl phenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene. Some of the other trifunctional compounds are 2,4-dihydroxy benzoic acid, trimesic acid, cyanuric chloride and 3,3-bis-(4-hydroxyphenyl)-2-oxo-2,3-dihydroindole.

The aromatic high molecular weight polycarbonates preferably have average molecular weights (weight averages) $\overline{M}_w$ of at least 10,000, more especially from 10,000 to 200,000 and most preferably from 20,000 to 80,000 as determined by measuring relative viscosity in $CH_2Cl_2$ at 25° C. at a concentration of 0.5% by weight.

The graft polymers (2) are obtained by polymerising monomers, preferably styrene and acrylonitrile, in the presence of a diene rubber. In these products, a monomer mixture of 95 to 50% by weight of styrene, methyl methacrylate or mixtures thereof and 5 to 50% by weight of acrylonitrile, methacrylonitrile or mixtures thereof are polymerised in the presence of a rubber. The graft polymer contains 80 to 10 parts by weight of rubber and 20 to 90 parts by weight of copolymer, preferably styrene-acrylonitrile copolymer, which is at least partly chemically bonded ("grafted on") to the rubber. In general, only part of the styrene and acrylonitrile is actually grafted on. In addition to the styrene-acrylonitrile graft polymer actually grafted on, non-grafted styrene-acrylonitrile copolymer is generally present as well. In the context of the invention, diene rubbers are, in particular, polybutadiene, butadiene/styrene copolymers containing up to 30% by weight of copolymerised styrene, copolymers of butadiene and acrylonitrile containing up to 20% by weight of acrylonitrile, or copolymers of butadiene containing up to 20% by weight of a lower alkyl ester of acrylic acid or methacrylic acid (for example methyl acrylate, ethyl acrylate, methyl methacrylate and ethyl methacrylate). The graft copolymers may be obtained in known manner by the radical polymerisation of styrene and acrylonitrile in the presence of the rubber in bulk, emulsion, suspension or by combined processes, such as bulk/suspension polymerisation or solution/precipitation polymerisation. For example, graft polymers based on polybutadiene are obtained by polymerising the monomers, such as styrene and acrylonitrile, in the presence of a latex of the butadiene polymer. The polymer particles in the latex of the butadiene polymer generally have a particle size in the range of from 0.2 to 5$\mu$.

It is also possible to produce graft polymers in which the polymer particles have a particle size in the range of from 0.05 to 0.8$\mu$ by emulsion polymerisation. The production of the graft polymers used in accordance with the invention is not confined to the process of emulsion polymerisation. The graft polymers may also be obtained by dissolving the rubber in the monomers, for example in styrene and acrylonitrile, initiating the polymerisation reaction by heating and adding radical formers, forming a suspension by the addition of water after a certain monomer conversion has been reached and completing the reaction as a bead polymerisation reaction. One such procedure is described, for example, in German Auslegeschrift No. 1,245,131.

The copolymer (3) is chemically uniform in structure and has an intrinsic viscosity ($\eta$) of from 0.5 to 1,0, as measured in dimethyl formamide at 25° C.

Chemically uniform copolymers are only formed if the ratio of the concentrations of the individual monomers is kept constant during the polymerisation reaction. In practice, this necessitates continuous polymerisation ("monomer input process"). In this context, chemically uniform means that the distribution of the monomer units whithin a given polymer molecule is uniform and that all polymer molecules have nearly the same monomer distribution. Thus, the continuous polymerisation of a mixture of 74% by weight of styrene, 22% by wt. of acrylonitrile and 4% by wt. of maleic acid anhydride at 35% by wt. conversion yields a copolymer (component (3)) which is suitable for the moulding compositions according to the invention. By contrast, the copolymer formed from the same monomer mixture by batchtype copolymerisation is unsuitable. Copolymers (3) in which the acrylonitrile content is similar or equal to that the styrene-acrylonitrile graft polymers are particularly suitable for the moulding compositions according to the invention. By varying the maleic acid anhydride content of the copolymers (3), dimensional stability under heat is influenced. Thus, heat distortion of the moulding compositions can be adjusted not only through the total content of copolymers (3), but also through the composition of copolymer (3).

Chemically uniform copolymers of the above-mentioned monomers (with statistical distribution of the monomer units) and their production are known (cf. U.S. Pat. Nos. 3,336,267 and 2,769,804).

The moulding compositions according to the invention may be produced at relatively low temperatures in conventional mixing units. Suitable mixing units are, for example, mixing rolls, twin-screw extruders and internal mixers. Fillers, glass fibres, pigments or other additives, such as stabilisers, flameproofing agents, flow aids, lubricants, mould release agents and antistatic agents, may be added during mixing of the components.

Generally speaking, the thermal stability of the moulding compositions according to the invention is significantly higher than that of comparable known moulding compositions, for example, of polycarbonate based on 2,2-bis-(4-hydroxyphenyl)-propane and ABS-polymers (cf. Table 1 with 2).

They may be used with advantage in particular for applications requiring favourable electrical insulating properties, high dimensional stability under heat, good resistance to hydrolysis and saponification, high toughness and easy processibility. Thus, they may be used with advantage for the production of pipes for hot alkaline or acid solutions, for the production of high-quality seals, tableware, instruments sterilisable with hot steam, washing machine components, battery containers, dry battery housings, housings and other insulating components in electrically driven machines, for the production of electrical insulating films, hydrolysis-stable vessel linings, chemically and thermally resistant filter cloths and many other things.

In the following Examples, the parts quoted represent parts by weight and the percentage percent by weight.

EXAMPLE 1

Production of a terpolymer of styrene, acrylonitrile and maleic acid anhydride (SAMA-copolymer)

2000 parts of a solution of 7260 parts of styrene, 2200 parts of acrylonitrile, 440 parts of maleic acid anhydride and 25 parts of tert.-dodecyl mercaptan are introduced into a jacketed reaction vessel provided with a paddle stirrer, a temperature sensor and with inlet and outlet pipes. The contents of the reactor are then heated to 95° C. and the polymerisation reaction is initiated at that temperature, the above-mentioned solution being delivered to the reactor at a throughout of 2000 parts per hour and the same quantity being uniformly removed. The initiator is also continuously delivered to the reactor at a rate of 0.6 part of tert.-butyl perpivalate (75% in dibutyl phthalate) per hour, so that a polymer solution with a solids content of approximately 30% is formed after about 2 hours. The polymer solution running off has 0.1% by weight of 2,6-di-tert.-butyl-p-cresol added to it and is subsequently freed from the monomers and the volatile constituents in an evaporation extruder.

The SAMA copolymer contains 17% by weight of acrylonitrile, 12% by weight of maleic acid anhydride and 71% by weight of styrene. It has an intrinsic viscosity ($\eta$) of 0.7 dl/g, 25° in dimethylformamide.

The chemical distribution of the monomer units in the fractions of different molecular weight is shown in the following Table:

| Fraction No. | % by weight | ($\eta$) | % by weight AN | % by weight MSA | % by weight styrene |
|---|---|---|---|---|---|
| 1 | 4.21 | 1.28 | 18 | 12.3 | 69.7 |
| 2 | 7.25 | 1.09 | 18.6 | 12.7 | 68.7 |
| 3 | 19.16 | 0.96 | 17.2 | 12.9 | 69.9 |
| 4 | 9.73 | 0.86 | 18.6 | 11.9 | 69.5 |
| 5 | 11.14 | 0.77 | 18.4 | 12 | 69.6 |
| 6 | 11.52 | 0.64 | 18.0 | 11.5 | 70.5 |
| 7 | 11.91 | 0.52 | 16.5 | 12 | 71.5 |
| 8 | 26.75 | 0.50 | 13.5 | 12.1 | 74.4 |

Fractionation was carried out from dimethyl formamide with cyclohexane at 78° C.

PRODUCTION OF THE MIXTURES

COMPARISON EXAMPLE 2

Mixtures of polycarbonate, styrene-acrylonitrile copolymer and graft polymer:

The polycarbonate based on 4,4'-dihydroxy-2,2-diphenyl propane (BPA-polycarbonate) had a relative viscosity of 1.28, as measured on a solution of 0.5 g of polycarbonate in 100 ml of methylene chloride at 25° C. The SAN-copolymer used was a standard commercial-grade resin consisting of 25 parts of acrylonitrile and 75 parts of styrene and had an intrinsic viscosity ($\eta$) of 0.9 dl/g. The ABS-graft polymer is produced by polymerising 35 parts of styrene and 15 parts of acrylonitrile on to 50 parts of a polybutadiene (by emulsion polymerisation in accordance with German Auslegeschrifts Nos. 1,247,665 and 1,269,360), the polybutadiene graft base present in latex form having an average particle diameter of from 0.2 to 0.4 $\mu$.

The components are mixed in an internal kneader, spun off in the form of strands, granulated and injection-moulded into test specimens. Table 1 shows the thermomechanical properties of the polymer mixtures produced.

EXAMPLE 3

Mixtures of components 1, 2 and 3 according to the invention:

The production of component 3 is described in Example 1. The BPA-polycarbonate is that of Comparison Example 3. The ABS-graft polymer is also described in Comparison Example 3.

Table 2 shows the thermomechanical values of the mixtures according to the invention which are produced by mixing the components in an internal mixer, followed by granulation and injection-moulding into test specimens.

Table 1

| Mixture components | a | b | c | d | Test method | Units |
|---|---|---|---|---|---|---|
| BPA-PC | 50 | 45 | 65 | 70 | according to DIN. | |
| SAN-cop. | 25 | 19.5 | 12.5 | 10.5 | | |
| Graft polym. | 25 | 35.5 | 22.5 | 19.5 | | |
| Tensile strength | | 35 | 40 | 45 | 53571 | MPa |
| Elongation at break | | 40 | 45 | 50 | 53504 | % |
| Tensile stress | | 45 | 50 | 55 | 53455 | MPa |
| E-modulus in flexure | 1800 | 1950 | 2100 | 2200 | 53457 | MPa |
| Impact strength at room temperature | unbr. | unbr. | unbr. | unbr. | 53453 | kJ/m$^2$ |
| Notched impact Strength at room tmperature | >30 | >25 | >30 | >30 | 53453 | kJ/m$^2$ |
| Vicat B | 116 | 110 | 120 | 125 | 53460 | °C. | unbr. = unbroken

Table 2

| Mixture components | a | b | c | d | Test method | Units |
|---|---|---|---|---|---|---|
| BPA-PC | 50 | 40 | 40 | 40 | according to DIN. | |
| SAMA-cop. | 17.5 | 36 | 27.5 | 22 | | |
| Graft polym. | 32.5 | 24 | 32.5 | 38 | | |
| Tensile strength | 42 | 48 | 44 | 44 | 53571 | MPa |
| Elongation at break | 77 | 33 | 49 | 80 | 53504 | % |
| Tensile stress | 48 | 58 | 53 | 50 | 53455 | MPa |
| E-modulus in flexure | 1970 | 2440 | 2170 | 2080 | 53457 | MPa |
| Impact strength at room temperature | unbr. | unbr. | unbr. | unbr. | 53453 | kJ/m² |
| Notched impact strength at room temperature | 49 | 38 | 45 | 47 | 53453 | kJ/m² |
| Vicat B | 125 | 127 | 126 | 124 | 53460 | °C. | unbr. = unbroken

We claim:

1. A thermoplastic moulding composition comprising:
   (1.) 80 to 20 parts by weight of a thermoplastic polycarbonate based on a dihydroxy diaryl alkane,
   (2.) 20 to 80 parts by weight of a graft polymer of
      2.2. a monomer mixture, polymerised onto
      2. a diene rubber with a glass transition temperature below $-30°$ C., said monomer mixture consisting of
      2.2.1. 95 to 50% by weight of styrene, methyl methacrylate or a mixture thereof; and
      2.2.2. 50 to 5% by weight of acrylonitrile, methacrylonitrile or a mixture thereof,
      the ratio by weight of rubber (2.1) to monomer mixture (2.2.) being in the range of from 80:20 and 10:90, and the moulding composition containing from 5 to 35% by weight of the rubber (2.1), and
   (3.) 5 to 75 parts by weight of a copolymer which is chemically uniform in structure and which comprises:
      3.1 93 to 50 parts by wieght of styrene, methyl methacrylate or a mixture thereof;
      3.2 40 to 5 parts by weight of acrylonitrile, methacrylonitrile or a mixture thereof; and
      3.3 2 to 30 parts by weight of maleic acid anhydride.

2. A thermoplastic moulding composition as claimed in claim 1, wherein it contains from 7.5 to 30% by weight of the rubber (2.1).

3. A thermoplastic moulding composition as claimed in claim 1, wherein the graft polymer (2) is an emulsion polymer (2) and in the moulding composition consists of particles having an average diameter of substantially 0.05 to 0.8 $\mu$.

4. A moulding composition as claimed in claim 1, wherein the copolymer (3) consists of 15 to 30 parts by weight of acrylonitrile, 7.5 to 15 parts by weight of maleic acid anhydride and 77.5 to 55 parts by weight of styrene.

* * * * *